United States Patent
Johnson et al.

(10) Patent No.: US 12,405,943 B2
(45) Date of Patent: Sep. 2, 2025

(54) GENERATING MINOR COMPACTIONS TO CAPTURE AGGREGATED ACTIONS FOR COMMIT RANGES TO DATA FILES

(71) Applicant: Databricks, Inc., San Francisco, CA (US)

(72) Inventors: Frederick Ryan Johnson, Orem, UT (US); Prakhar Jain, Sunnyvale, CA (US)

(73) Assignee: Databricks, Inc., San Francisco, CA (US)

( * ) Notice: Subject to any disclaimer, the term of this patent is extended or adjusted under 35 U.S.C. 154(b) by 78 days.

(21) Appl. No.: 18/415,396

(22) Filed: Jan. 17, 2024

(65) Prior Publication Data
US 2025/0231930 A1    Jul. 17, 2025

(51) Int. Cl.
*G06F 16/23*    (2019.01)
*G06F 16/174*    (2019.01)

(52) U.S. Cl.
CPC ...... *G06F 16/2379* (2019.01); *G06F 16/1744* (2019.01)

(58) Field of Classification Search
CPC .......................... G06F 16/2379; G06F 16/1744
USPC ........................................................ 707/693
See application file for complete search history.

(56) References Cited

U.S. PATENT DOCUMENTS

| | | | | |
|---|---|---|---|---|
| 9,639,544 | B1* | 5/2017 | Smith | G06F 16/183 |
| 12,204,931 | B1* | 1/2025 | Averin | G06F 11/0778 |
| 2016/0328429 | A1* | 11/2016 | Lipcon | G06F 16/221 |
| 2017/0193041 | A1* | 7/2017 | Fuchs | G06F 16/21 |

* cited by examiner

*Primary Examiner* — Joshua Bullock
(74) *Attorney, Agent, or Firm* — Fenwick & West LLP

(57) ABSTRACT

A data processing service uses minor compactions for committing transactions to a data table. The service may receive requests to commit transactions to a data table and write metadata for the transactions to log files, and generate a checkpoint file aggregating the transactions described in the log files to compute a data table state at a first time. The service may receive requests to commit a set of transactions and write metadata for the set of transactions to a set of log files. The service may determine that a number of log files in the set of log files reaches a threshold commit number, generate a minor compaction file aggregating the set of transactions, and generate a second checkpoint file aggregating the data table state at the first time with information from the minor compaction file to compute the data table state at a second time.

20 Claims, 8 Drawing Sheets

GENERATING MINOR COMPACTIONS TO CAPTURE AGGREGATED ACTIONS FOR COMMIT RANGES TO DATA FILES

TECHNICAL FIELD

This disclosure relates generally to data storage technologies, and more particularly to managing data files for a data table.

BACKGROUND

A data processing service may manage a significant amount of data for one or more entities in various forms, such as raw data or data tables. A data table may include a plurality of records or instances, where each record includes values for one or more features. The data processing service may manage data tables with many records as one or more data files, in which a data file includes a respective subset of records of a data table. Thus, the data processing service may manage large file repositories. Moreover, the data processing service may receive requests from users to perform one or more transaction operations on a data table that include, for example, read or write operations. For example, a user (e.g., data analyst) associated with an entity may request that the data processing service modify a data table to include a new set of records for the entity. A transaction to a data table may be captured in a log file (e.g., JSON file). Therefore, a significant number (e.g., 10,000 or 100,000) log files may be created for a data table, and significant input/output (I/O) operation costs occur to reconstruct the current state of a data table by aggregating the transactions in the log files.

Thus, the data processing service may perform a checkpointing operation to create a snapshot or a consistent state of the data table at a specific point in time. For example, the data processing service may generate a checkpoint file that covers the transactions aggregated from when the table was created until the specific point in time. However, frequent checkpointing may cause several issues, especially for large size tables. The checkpointing operation involves a full state reconstruction which is a slow operation. The latency is introduced as the system needs to rewrite large checkpoint files (e.g., GB's of data) multiple times. For example, a checkpointing operation may take more than 3-4 minutes in some large customer tables even on large clusters. If checkpoints are taken frequently, the cumulative time spent on the checkpointing process can become a significant factor in the overall system latency. The creation of this full copy results in additional writes to the storage system, effectively amplifying the amount of data being written.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a data processing service, in accordance with an embodiment.

DETAILED DESCRIPTION

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

The disclosed configurations provide a method (and/or a computer-readable medium or system) for committing transactions to a data table using minor compactions. The configuration may receive requests to commit transactions to a data table and write metadata for the transactions to log files, and generate a checkpoint file aggregating the transactions described in the log files to compute a data table state at a first time. The configuration may receive requests to commit a set of transactions and write metadata for the set of transactions to a set of log files. The set of transactions are transactions that are committed after the one or more transactions of the checkpoint file. The configuration may determine that a number of log files in the set of log files reaches a threshold commit number, and generate a minor compaction file aggregating the set of transactions. The configuration generates a second checkpoint file aggregating the data table state at the first time with information obtained from the minor compaction file to compute the data table state at a second time.

Figure 1:
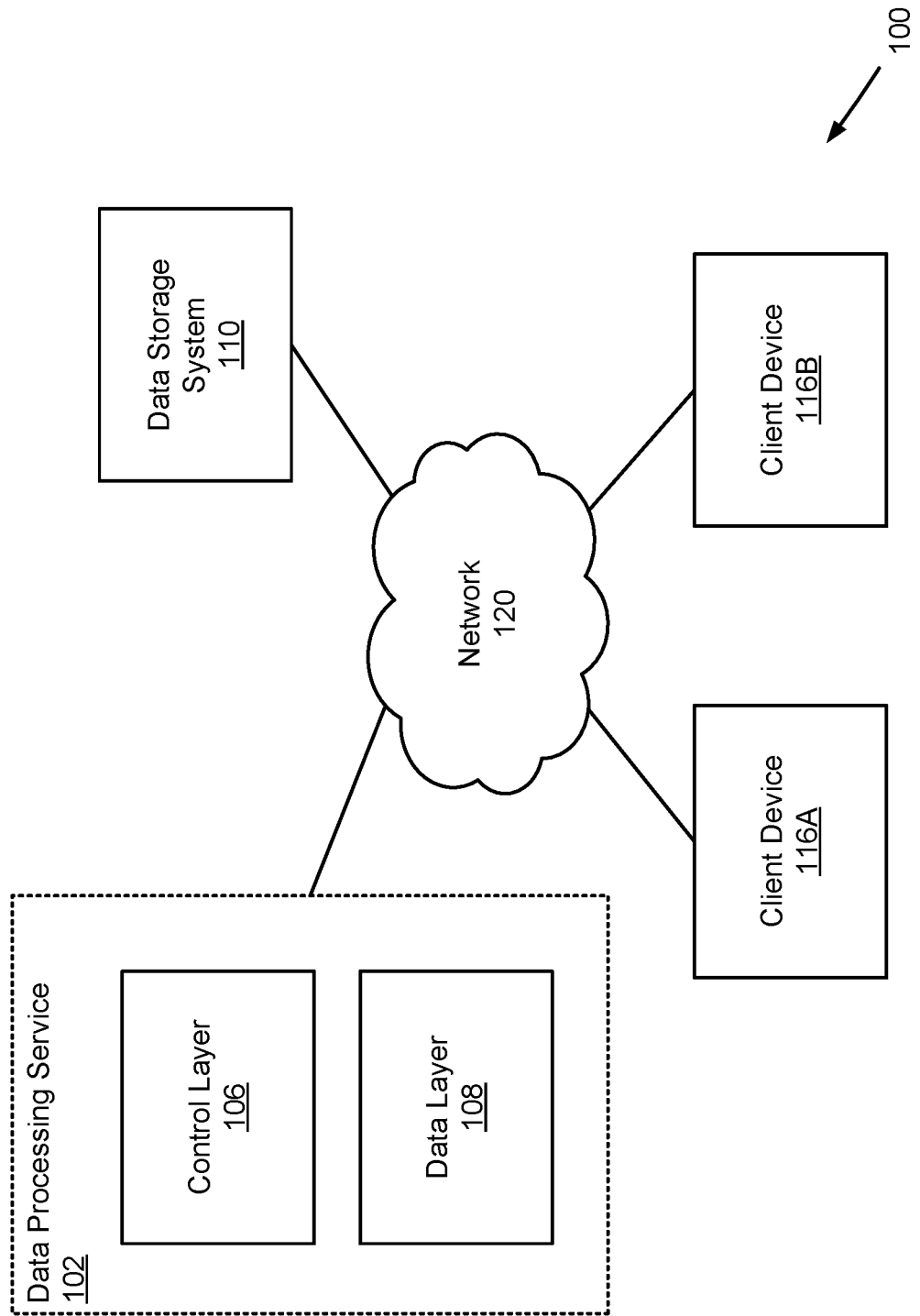

Figure (FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 800 as described with FIG. 8.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

As described in more detail below, in one embodiment, the data processing service 102 provides a method by which a log file captures a transaction to a data table and a checkpoint file describes the state of the data table at a given point in time by analyzing the transactions recorded in the log files until that time. When creating a new checkpoint file, substantial amount of data needs to be rewritten. Often times, for larger tables, gigabytes (GBs) of data are being overwritten, implying that the entire dataset or a significant portion of it may be replaced even if only a small amount of new data has been added or modified. Frequent rewriting of large amounts of data may be resource-intensive in terms of storage Input/Output (I/O). In some implementations, the log files are in the form of a JSON file or other standard format. In some instances, the log files may be small, containing a small amount of transaction information. However, managing and aggregating information from many, multiple files can be computationally expensive and time-consuming, incurring a significant overhead on the I/O cost.

Therefore, in one embodiment, the data processing service 102 uses minor compactions to create minor compaction files which aggregate transactions over an interval of commits. Minor compactions roll up the transactions since the most recent checkpoint and produce a consolidated and incremental compacted delta that can be merged with the previous checkpoint to create a new checkpoint file. Therefore, at each checkpoint, the data processing service 102, instead of reading many individual log files, may only read a few minor compaction files that are created since the last checkpoint. For example, with the minor compaction, 100 small log files become a single 100 kB minor compaction file. Instead of reading these 100 small log files at the checkpoint, the data processing service 102 may read a set of minor compaction files, which in total may be multiple GB in size. In this way, by increasing the interval of commits between two checkpoints, the frequency of checkpointing may be reduced and the I/O cost and efficiency may be improved. Additional details are discussed below in connection with FIG. 5 to FIG. 7.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 800 as described with FIG. 8.

In one embodiment, a client device 116 executes an application allowing a user of the client device 116 to interact with the various systems of the system environment 100 of FIG. 1. For example, a client device 116 can execute a browser application to enable interaction between the client device 116 and the data processing system 106 via the network 120. In another embodiment, the client device 116 interacts with the various systems of the system environment 100 through an application programming interface (API) running on a native operating system of the client device 116, such as IOS® or ANDROID™

Figure 2:
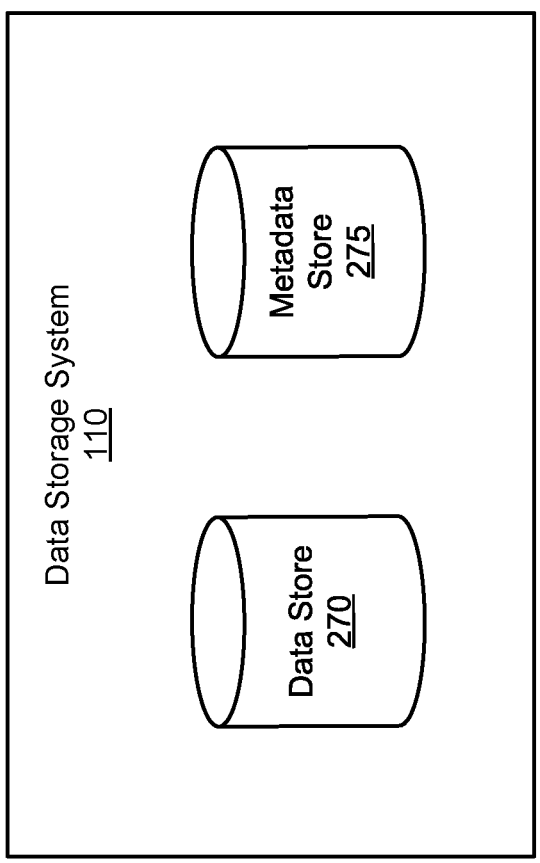
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data table store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In one embodiment, the transaction log for a data table in the metadata store 275 includes one or more log files (e.g., JSON files) that each capture a transaction to the data table. A log file may include details of one or more transactions made to a respective set of data files of the data table. For example, the log may include the name of the data file, statistics of the data file including min-max ranges for a set of keys, size of the data file, type of transaction (e.g., write, add, update) committed, and the like. The metadata store 275 may also store one or more checkpoint files for the data table. Specifically, a set of checkpoint files describes the state of a data table at a given point in time by analyzing the transactions recorded in the log files until that time. Therefore, metadata for a data table may be characterized by a set of checkpoint files and one or more log files that describe transactions to the data table committed after the set of checkpoint files were created.

Figure 3:
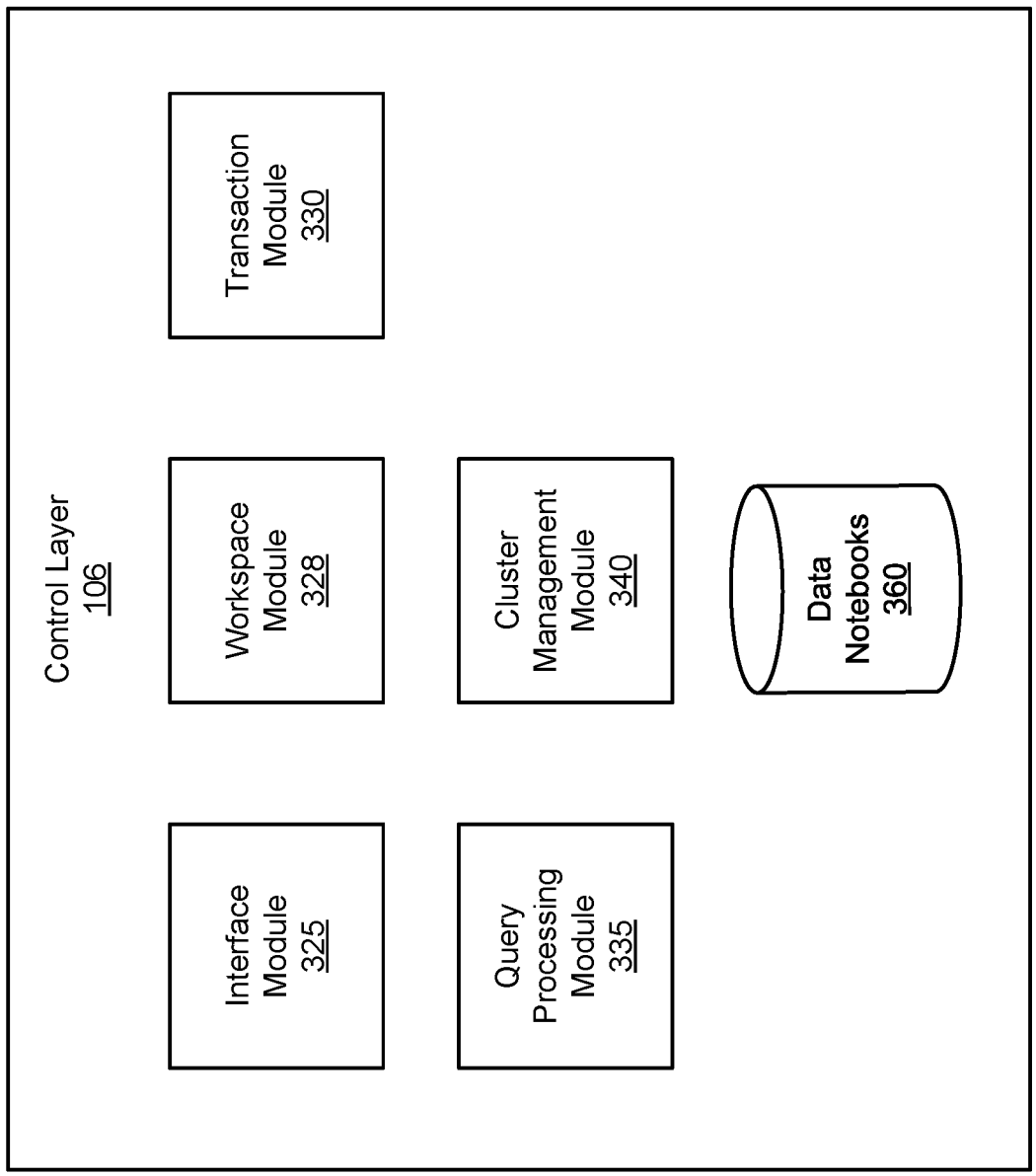
FIG. 3 illustrates a block diagram of an architecture of a control layer, in accordance with an embodiment.

FIG. 3 is a block diagram of an architecture of a control layer 106, in accordance with an embodiment. In one embodiment, the data processing system 106 includes an interface module 325, a transaction module 330, a query processing module 335, and a cluster management module 340. The control layer 106 also includes a data notebook store 360. The modules 325, 330, 335, and 340 may be structured for execution by a computer system, e.g., 800 having some or all of the components as described in FIG. 8, such that the computer system 800 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

In one embodiment, the transaction module 330 creates log files that each record a commit to the data table by a user. At predetermined intervals, the transaction module 330 may aggregate transactions across multiple log files and create a checkpoint file that represents a current state of the data table, incorporating changes from when the table was created to a given point in time.

In one embodiment, the transaction module 330 also creates a minor compaction file that covers an interval of transactions. In one example, each transaction may be described using a log file, e.g., 000x.json, representing the changes for version "000x" of a data table. A single transaction may include one or more actions to the data table, e.g., remove, modify, or add data files to the data table, and the like. A log file for a transaction, e.g., 000x.json, may record all these actions and the corresponding file paths for that transaction. A minor compaction represents a compaction of changes between version "000x" of the data table and version "000y" of the data table. For example, a minor compaction file, 000x.000y.compact.json, may represent all the changes from commit "000x" through commit "000y." A checkpoint file, e.g., 000z.checkpoint, may include all transaction information from commit "0000" to "000z."

Without using a minor compaction file, for each checkpointing, the transaction module 330 rewrites the data table with each individual log file for transactions to be committed since last checkpoint. With minor compaction files, the changes through the log files are compacted in the minor compaction file. Therefore, instead of aggregating transactions in each individual log file to create a checkpoint file, the transaction module 330 may aggregate the previous state of the data table with the information in the minor compaction file to create a checkpoint file for the current state of the data table.

In one embodiment, the transaction module 330 when aggregating two or more transactions may perform action reconciliation to reconcile one or more related actions with each other. This is because a given state of the table is computed by replaying the events committed to the table in ascending order by commit version, and in general, the newest change to the table "wins" or is retained. For example, when creating a checkpoint file, a previous transaction may indicate "add File A" and a subsequent transaction may indicate "remove File A," and the current state of the table may indicate that File A was removed or no longer existing.

In one embodiment, when adding a file to the data storage system 110, the recorded transaction "add File A" does not specify whether this add was the first creation of the file or whether this add is a redundant add for the file. For example, the initial creation of File A may be recorded as "add File A," and there may be an instance where metadata to File A is modified, and the modification is also recorded as "add File A." Therefore, for a minor compaction interval, when a transaction "add File A" and a subsequent transaction "remove File A" occurs, the remove action wins in the minor compaction to suppress a possible earlier version of the file. In another embodiment, the add transaction can specify whether the file is the first creation or a redundant add. In such an embodiment, if there is an add action and a subsequent remove action, then the mention of the file in the minor compaction can be dropped.

Figure 5:
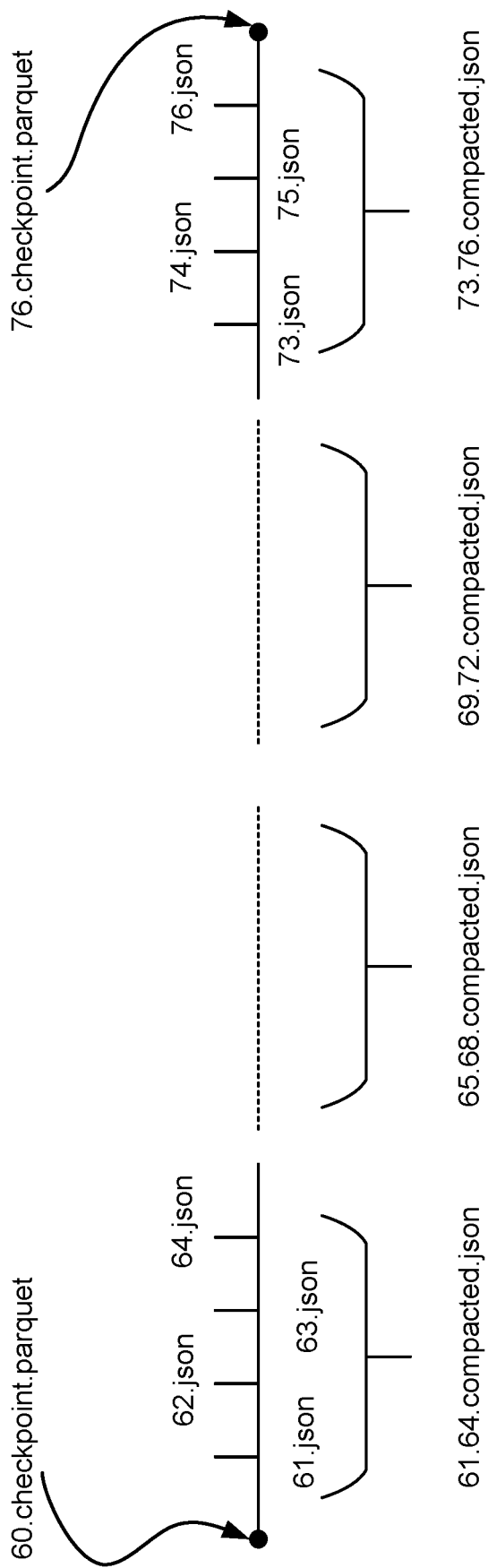
FIG. 5 illustrates an exemplary embodiment for committing a set of transactions to a data table using minor compaction files, in accordance with an embodiment.

FIG. 5 illustrates an exemplary embodiment for committing a set of transactions to a data table using minor compaction files, in accordance with an embodiment. The transaction module 330 may determine a compaction interval that compacts every compaction interval of commits after the last compaction, e.g., commitVersion-lastCompactionVersion. In some embodiments, the compaction interval may be a threshold commit number, e.g., 4, 6, etc. When a number of transactions to be committed reach the threshold commit number, the transaction module 330 will perform a minor compaction on the threshold commit number of transactions (e.g., log files) to create a minor compaction file for aggregating the transactions since last minor compaction.

In some embodiments, the transaction module 330 may determine a checkpoint interval that performs a checkpointing operation for every checkpoint interval of commits after the last checkpoint, e.g., commitVersion-lastCheckpointVersion. In some embodiments, the compaction interval may be a threshold commit number, e.g., 10, 100, 200, etc. When a number of transactions to be committed reach the threshold commit number, the transaction module 330 will perform a checkpointing operation on the threshold commit number of transactions (e.g., log files) to create a checkpoint file for aggregating the transactions since the last checkpoint.

As shown in FIG. 5, the transaction module 330 may determine a compaction interval to be 4 commits and a checkpoint interval to be 12 commits. For the previous transactions, the transaction module 330 may have created a checkpoint file, "60.checkpoint.parquet," which covers all transaction information from commit "00" to "60." As the transaction module 330 receives requests to commit transactions to the data table, the transaction module 330 may create minor compaction files when a number of transactions reaches the compaction interval, e.g., threshold commit number.

As shown in FIG. 5, the threshold commit number is 4, when the transaction module 330 creates a minor compaction file for every 4 transactions by aggregating transaction information in the log files of the transactions. For example, the transaction module 330 creates a minor compaction file "61.64.compacted.json" for log files "61.json," "62.json," "63.json," and "64.json," representing a compaction of changes between version "61" of the data table and version "64" of the data table. Similarly, the transaction module 330 creates minor compaction files, "65.68.compacted.json," "69.72.compacted.json," and "73.76.compacted.json." When the transaction module 330 determines that the number of transactions to be committed since the previous checkpoint (e.g., 60.checkpoint.parque) reaches the checkpoint interval, e.g., 12 commits, the transaction module 330 may perform a checkpointing operation using the minor compaction files. For example, the transaction module 330 performs a checkpointing operation to create a checkpoint file "76.checkpoint.parquet" by directly aggregating and reconciling the information in the minor compaction files, e.g., "61.64.compacted.json," rather than using each log file, e.g., "61.json," "62.json," etc. The checkpoint file "76.checkpoint.parquet" aggregates state of the data table from version "60" with the information in the minor compaction files and represents the state of the data table at version "76." In some embodiments, the transaction module 330 may perform a checkpointing operation using a mix of minor compaction files and log files. For example, instead of creating "73.76.compacted.json," the transaction module 330 may create "76.checkpoint.parquet" using the minor compaction files "61.64.compacted.json" "65.68.compacted.json," and "69.72.compacted.json" with individual log files, "73.json," "74.json," "75.json," and "76.json."

In some embodiments, the compaction interval and/or the checkpoint interval may be affected by a "tail latency" of a cloud storage. A "tail latency" is a measure of the slowest response times experienced by a subset of requests or transactions. It represents the outliers or extreme cases where the response time is significantly higher than the average or median response time. As the number of log files that the transaction module 330 reads from a cloud storage at a checkpoint increases, the probability that a file will straggle in I/O costs increases. After certain number of files, the probably of causing the tail latency is significantly high, causing a major delay. Therefore, the transaction module 330 may determine a threshold number of files (e.g., 10 files, 100 files) to read from a cloud storage at a given time to avoid the tail latency issue. That is, the transaction module 330 may limit the number of files to read from cloud storage at a given time.

In one embodiment, to increase the checkpoint interval as much as possible, the transaction module 330 creates a hierarchy of minor compaction files such that at a given time, less than a threshold number of files are read from the cloud storage. The hierarchy of minor compaction files may include multiple levels of minor compactions files. The lowest level of minor compaction files may be created by aggregating information from a plurality of log files, and the higher level of minor compaction files may be created by aggregating information from lower minor compaction files. As higher-level minor compaction files are created, the number of transactions between checkpoint intervals can be increased with the cost of writing the transactions covered in lower minor compaction files to a higher level minor compaction file.

In one example, the threshold number of files to read is represented as "n," "k" represents a number of compaction levels, and "m" represents a number of files each minor compaction rolls up. In one implementation, these three number parameters may have a relationship of m=floor (n/k), for under-spending the number of files before straggling. For example, assuming n=10 and k=3, the transaction module 330 may determine m=3. In another implementation, the relationship may be m=ceil (n/k), for over-spending the number of files before straggling. For example, assuming n=10 and k=3, the transaction module 330 may determine m=4. In some embodiments, the transaction module 330 may determine "n" (e.g., total number of files for latency straggling) and "m" (e.g., number of files aggregated into a compaction file), and use their relationship to determine "k" (e.g., number of compaction levels).

Based on the determined "n," "k," and "m," the transaction module 330 may iteratively create hierarchical minor compactions files. For example, the transaction module 330 may create a first level (e.g., L1) minor compaction file for every m number of commits across m log files, create a second level (e.g., L2) minor compaction file for every m number of L1 minor compaction files, and so on, until a desired number of compaction levels k is reached. For example, the transaction module 330 may perform an L1 minor compaction for every 10 commits, perform an L2 minor compaction for every 100 commits (10 L1 files×10 transactions each), and an L3 minor compaction for every 1000 commits (10 L2 files×100 transactions each). The corresponding L1 minor compaction files for a data table may include: 1.10.compacted.json, 11.20.compacted.json, 21.30.compacted.json, . . . , 81.90.compacted.json. At the 100th commit, the transaction module 330 may perform an L2 minor compaction and create a first L2 minor compaction file, e.g., 1.100.compacted.json. Then the transaction module 330 continues to create L1 minor compactions from the 101st commit, and create L1 minor compaction files, such as 101.110.compacted.json, 111.120.compacted.json, . . . , 181.190.compacted.json. At the 200th commit, the transaction module 330 may perform an L2 minor compaction and create a second L2 minor compaction file, e.g., 101.200.compacted.json. The transaction module 330 may iteratively create hierarchical minor compactions files, and at the 1000th commit, transaction module 330 may perform an L3 minor compaction and create 1.1000.compacted.json. At every level of compaction, the transaction module 330 may create 9 minor compaction files. At the fourth level, the transaction module 330 may perform a checkpointing operation that commits 10,000 transactions.

Figure 6:
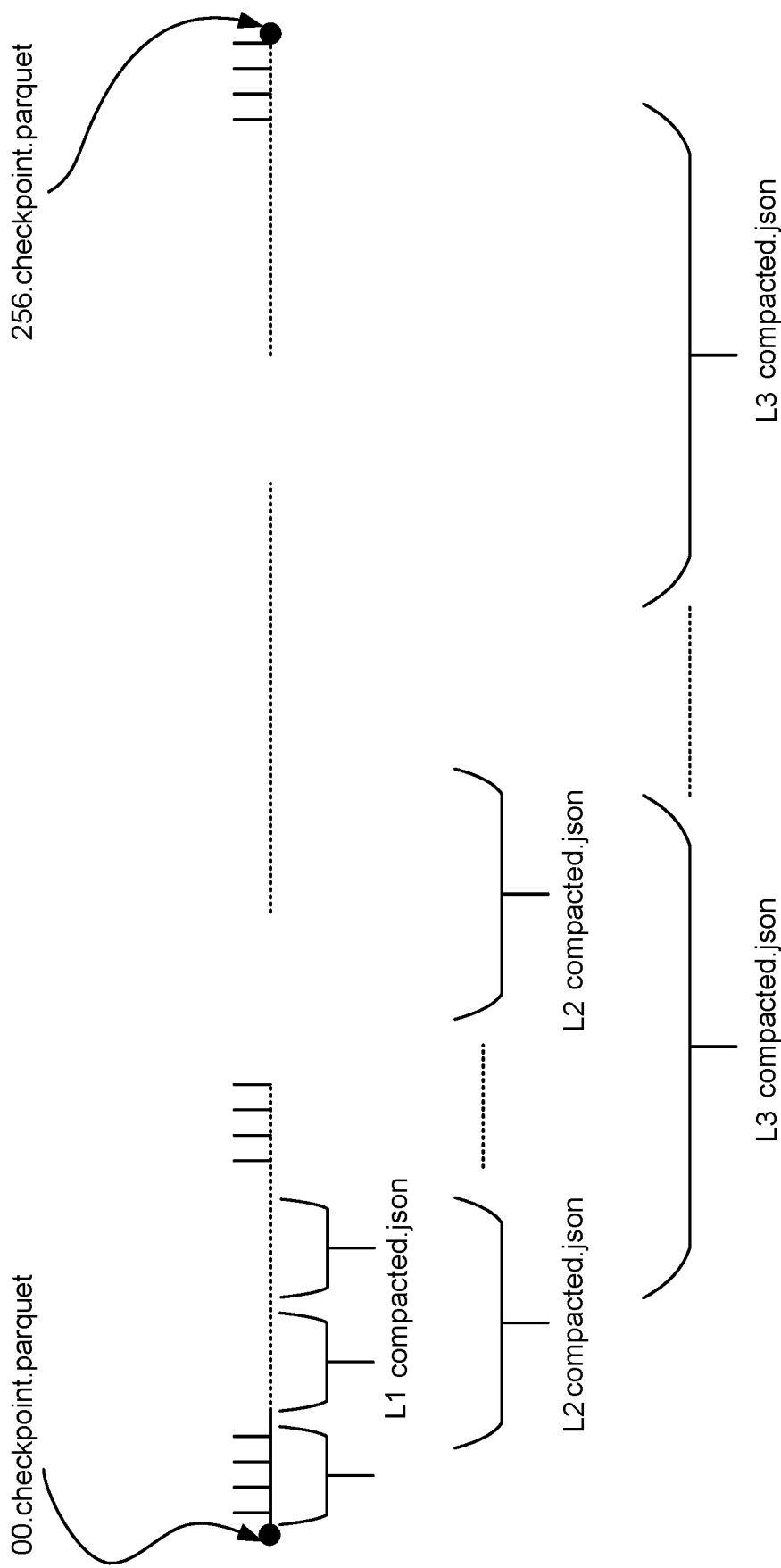
FIG. 6 illustrates an exemplary embodiment for committing a set of transactions to a data table using a hierarchy of minor compaction files, in accordance with an embodiment.

FIG. 6 illustrates an exemplary embodiment for committing a set of transactions to a data table using a hierarchy of minor compaction files, in accordance with an embodiment. The transaction module 330 may generate a checkpoint file, e.g., "00.checkpoint.parquet," which covers information of all previous committed transactions to a data table. The transaction module 330 receives request to commit a set of transactions to the data table. The transaction module 330 may perform hierarchical minor compactions and determine a threshold number of files to read, e.g., n=10, a number of compaction levels, e.g., k=3, and a number of files each compaction rolls up, m=4. The transaction module 330 may generate a set of first-level minor compaction files, e.g., L1 compacted.json. Each L1 minor compaction file may aggregate a respective set of 4 transactions. At the 16th commit, the transaction module 330 may generate a set of second-level minor compaction files, e.g., L2 compacted.json. Each L2 minor compaction file may aggregate the set of transactions in the set of L1 minor compaction files. At the 64th commit, the transaction module 330 may generate a set of third-level minor compaction files, e.g., L3 compacted.json. Each L3 minor compaction file may aggregate the set of transactions in the set of L2 minor compaction files. At the 256th commit, the transaction module 330 may perform a checkpointing operation and create a checkpoint file, e.g., "256.checkpoint.parquet," which includes information of all 256 commits and the previous committed transactions to the data table.

Specifically, the formula described above indicates that at the worst case, $(m-1) \times (k+1)$ files will be read at a given time, covering $(m-1)+(m-1) \times m^1+(m-1) \times m^2+ \ldots +(m-1) \times m^k$ transactions. For example, in the example shown in FIG. 6, at most, a total number of 12 files=$(4-1) \times (3+1)$ are created, covering 255 commits right before a checkpoint file is triggered. For example, there would be:

a first L3 minor compaction file 0.63.compacted.json, a second L3 file 64.127.compacted.json, a third L3 file 128.191.json, a first L2 minor compaction file 192.207.compacted.json, a second L2 minor compaction file 208.223.compacted.json, a third L2 file 224.239.compacted.json, a first L1 minor compaction file 240.243.compacted.json, a second L1 file 244.247.compacted.json, a third L1 file 248.251.compacted.json, and log files 252.json, 253.json, and 254.json, right before a checkpoint file is triggered.

In this manner, while write costs may increase as higher level minor compaction files are written from lower level minor compaction files, the read cost may stay relatively small when reconstructing a current state of the data table.

Referring back to FIG. 3, the query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

Figure 4:
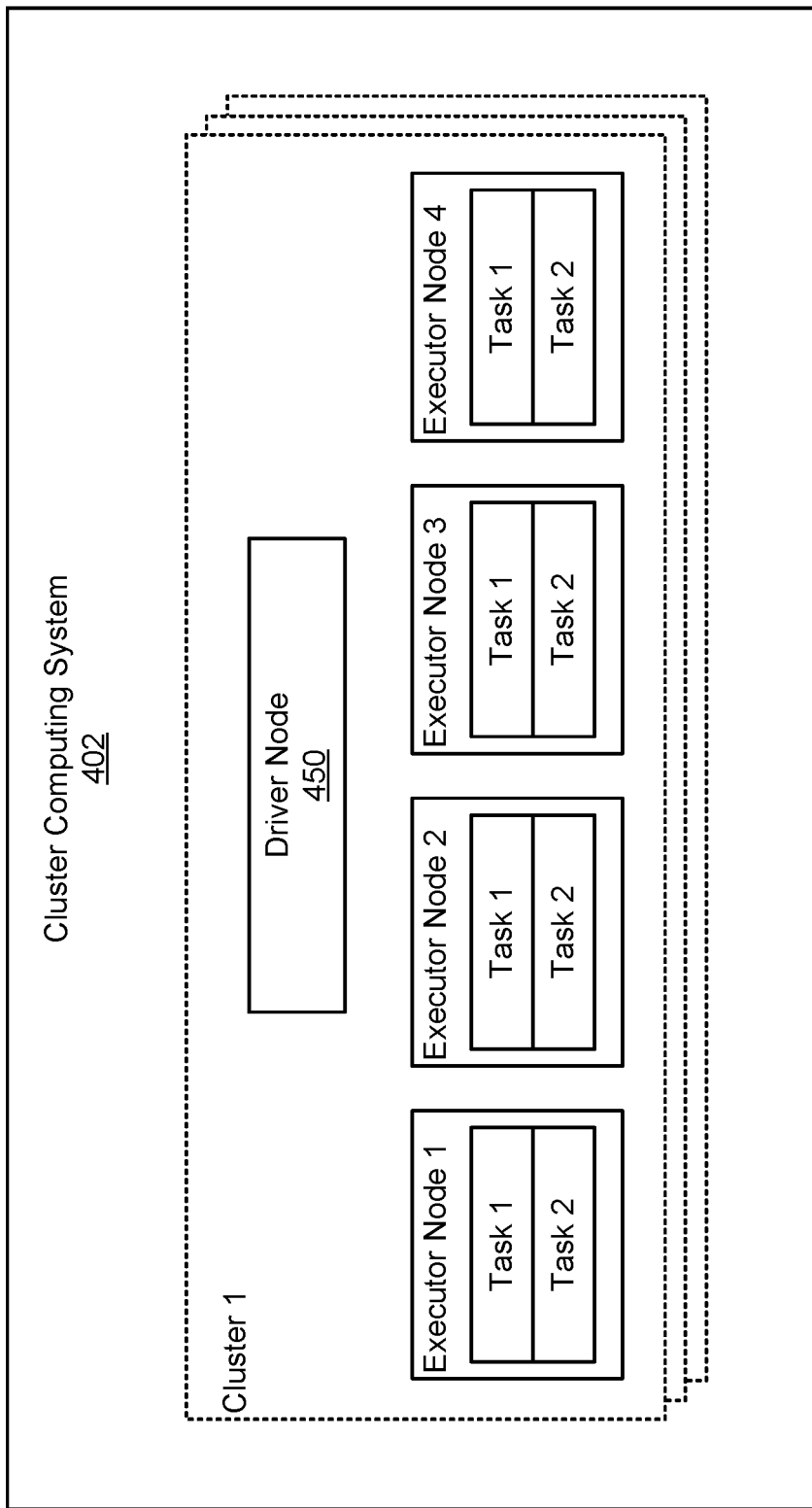
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 800 having some or all of the components as described in FIG. 8, such that the computer system 800 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Committing Transactions with Minor Compactions

Figure 7:
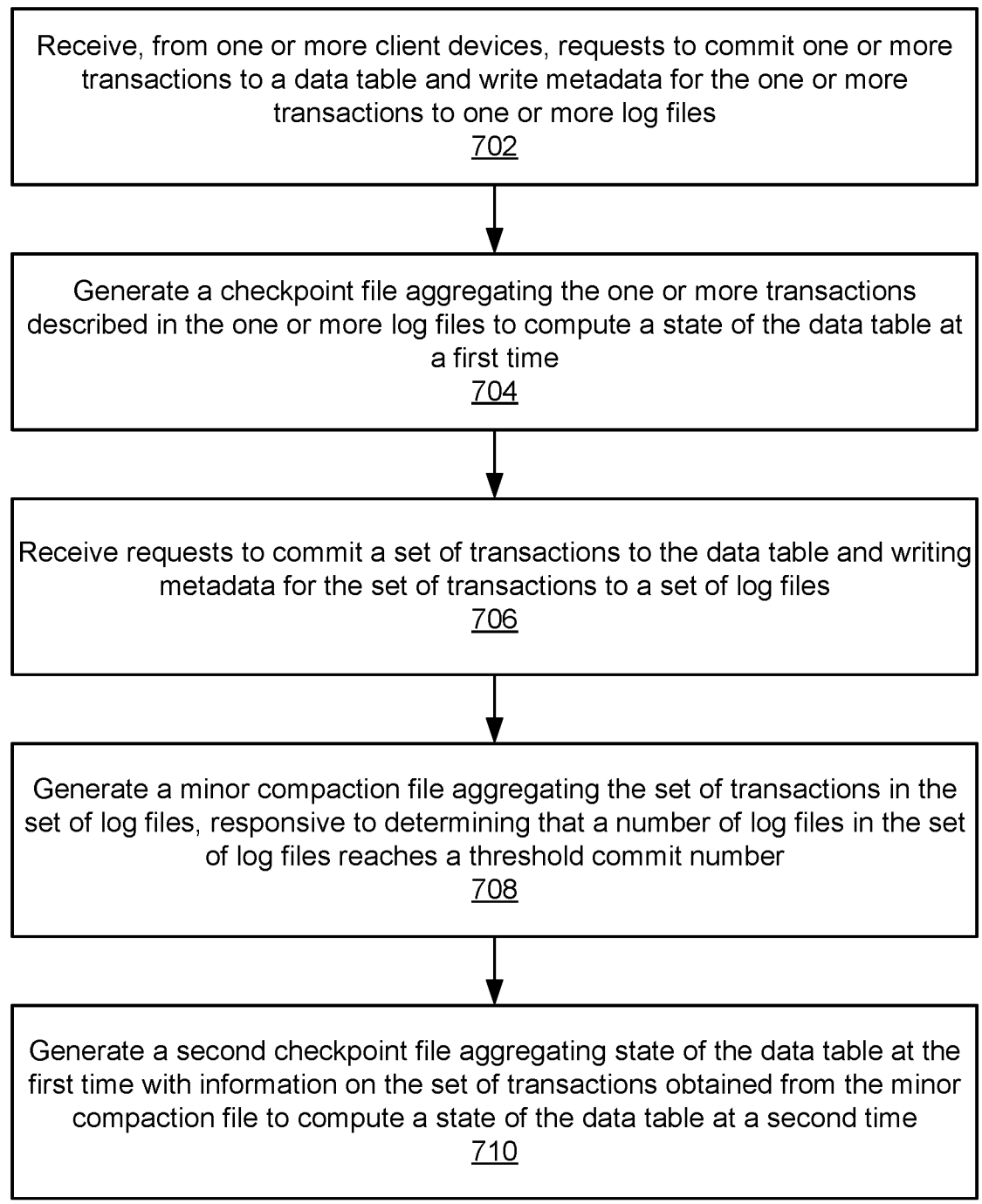
FIG. 7 illustrates a method for committing a set of transactions to a data table using minor compactions, in accordance with an embodiment.

FIG. 7 is a flowchart of a method for committing a set of transactions to a data table using minor compactions, in accordance with an embodiment. The process shown in FIG. 7 may be performed by one or more components (e.g., the control layer 106) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 8. Embodiments may include different and/or additional steps, or perform the steps in different orders.

The data processing service 102 may receive 702, from one or more client devices, requests to commit one or more transactions to a data table and write metadata for the one or more transactions to one or more log files. The data table is stored in a cloud storage as a set of data files. In some embodiments, committing a transaction comprises writing metadata for the respective transaction to a log file. The data processing service 102 may generate 704 a checkpoint file which aggregates the one or more transactions described in the one or more log files to compute a state of the data table at a first time. The data processing service 102 may receive 706 requests to commit a set of transactions to the data table and write metadata for the set of transactions to a set of log files. Responsive to determining that a number of log files in the set of log files reaches a threshold commit number, the data processing service 102 may generate 708 a minor compaction file that aggregates the set of transactions in the set of log files. The data processing service 102 may generate 710 a second checkpoint file that aggregates the state of the data table at the first time with information on the set of transactions obtained from the minor compaction file to compute a state of the data table at a second time.

In some embodiments, the data processing service 102 may generate a set of first-level minor compaction files including the minor compaction file. Each first-level minor compaction file may aggregate a respective set of transactions. The data processing service 102 may determine that a number of first-level minor compaction files reaches a threshold number and generate a second-level minor compaction file that aggregates the set of transactions in the set of first-level minor compaction files.

Figure 8:
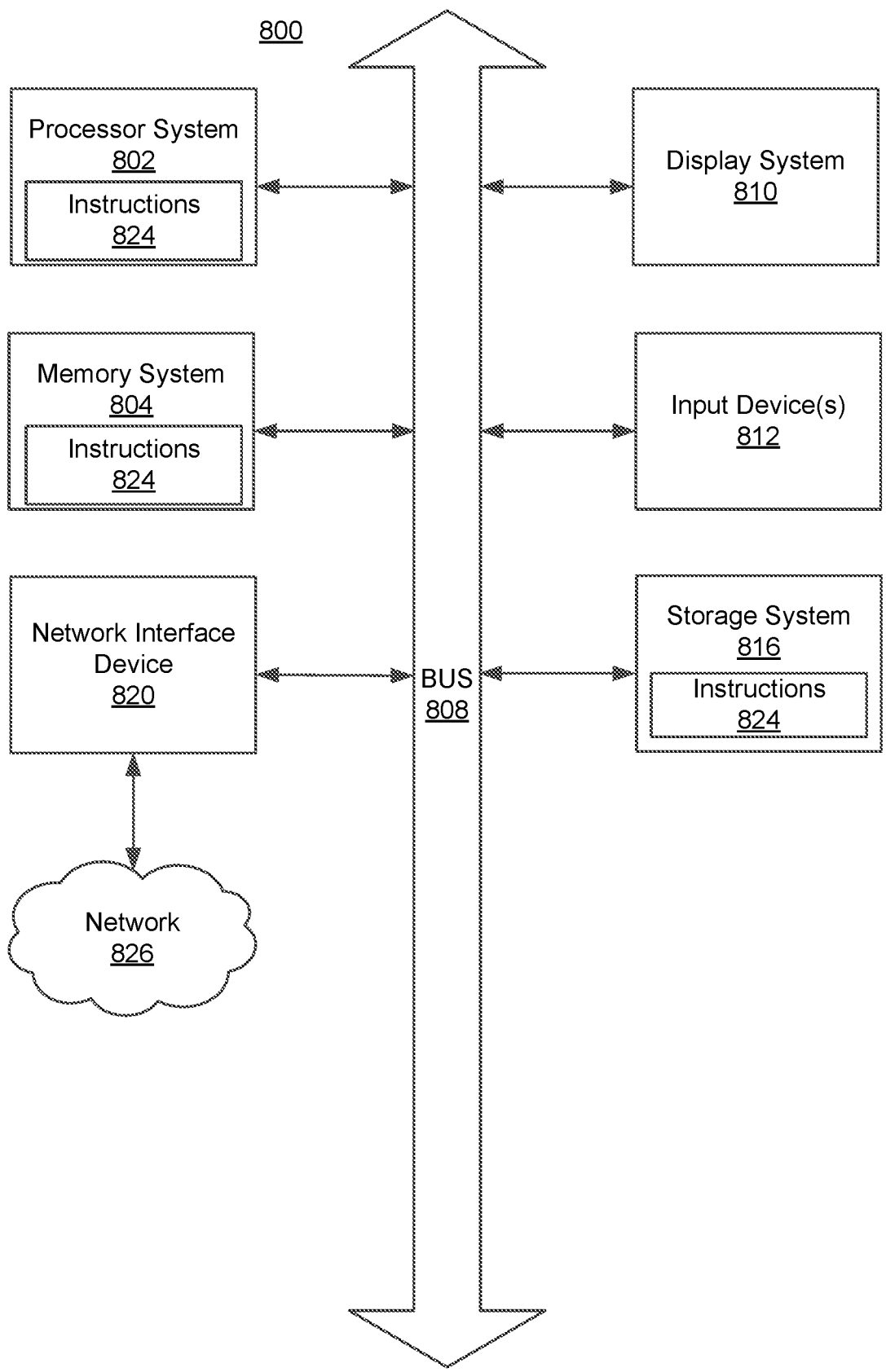
FIG. 8 is a block diagram illustrating an example machine to read and execute computer readable instructions, in accordance with an embodiment.

Turning now to FIG. 8, illustrated is an example machine to read and execute computer readable instructions, in accordance with an embodiment. Specifically, FIG. 8 shows a diagrammatic representation of the data processing service 102 (and/or data processing system) in the example form of a computer system 800. The computer system 800 is structured and configured to operate through one or more other systems (or subsystems) as described herein. The computer system 800 can be used to execute instructions 824 (e.g., program code or software) for causing the machine (or some or all of the components thereof) to perform any one or more of the methodologies (or processes) described herein. In executing the instructions, the computer system 800 operates in a specific manner as per the functionality described. The computer system 800 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 800 may be a server computer, a client computer, a personal computer (PC), a tablet PC, a smartphone, an internet of things (IoT) appliance, a network router, switch or bridge, or other machine capable of executing instructions 824 (sequential or otherwise) that enable actions as set forth by the instructions 824. Further, while only a single machine is illustrated, the term "machine" shall also be taken to include any collection of machines that individually or jointly execute instructions 824 to perform any one or more of the methodologies discussed herein.

The example computer system 800 includes a processing system 802. The processor system 802 includes one or more processors. The processor system 802 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 802 executes an operating system for the computing system 800. The computer system 800 also includes a memory system 804. The memory system 804 may include or more memories (e.g., dynamic random access memory (RAM), static RAM, cache memory). The computer system 800 may include a storage system 816 that includes one or more machine readable storage devices (e.g., magnetic disk drive, optical disk drive, solid state memory disk drive).

The storage unit 816 stores instructions 824 (e.g., software) embodying any one or more of the methodologies or functions described herein. For example, the instructions 824 may include instructions for implementing the functionalities of the transaction module 330 and/or the file management module 335. The instructions 824 may also reside, completely or at least partially, within the memory system 804 or within the processing system 802 (e.g., within a processor cache memory) during execution thereof by the computer system 800, the main memory 804 and the processor system 802 also constituting machine-readable media. The instructions 824 may be transmitted or received over a network 826, such as the network 826, via the network interface device 820.

The storage system 816 should be taken to include a single medium or multiple media (e.g., a centralized or distributed database, or associated caches and servers communicatively coupled through the network interface device 820) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 800 can include a display system 810. The display system 810 may driver firmware (or code) to enable rendering on one or more visual devices, e.g., drive a plasma display panel (PDP), a liquid crystal display (LCD), or a projector. The computer system 800 also may include one or more input/output systems 812. The input/output (IO) systems 812 may include input devices (e.g., a keyboard, mouse (or trackpad), a pen (or stylus), microphone) or output devices (e.g., a speaker). The computer system 800 also may include a network interface device 820. The network interface device 820 may include one or more network devices that are configured to communicate with an external network 826. The external network 826 may be a wired (e.g., ethernet) or wireless (e.g., WiFi, BLUETOOTH, near field communication (NFC).

The processor system 802, the memory system 804, the storage system 816, the display system 810, the IO systems 812, and the network interface device 820 are communicatively coupled via a computing bus 808.

ADDITIONAL CONSIDERATIONS

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information.

These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:
   receiving, from one or more client devices, requests to commit one or more transactions to a data table and write metadata for the one or more transactions to one or more log files, wherein the data table is stored in a cloud storage as a set of data files;
   generating a checkpoint file aggregating the one or more transactions described in the one or more log files to compute a state of the data table at a first time;
   receiving requests to commit a set of transactions to the data table and write metadata for the set of transactions to a set of log files, wherein the set of transactions are transactions that occur after the one or more transactions;
   responsive to determining that a number of log files in the set of log files reaches a threshold commit number, generating a minor compaction file aggregating the set of transactions in the set of log files; and
   generating a second checkpoint file aggregating the state of the data table at the first time with information on the set of transactions obtained from the minor compaction file to compute a state of the data table at a second time.

2. The method of claim 1, further comprising:
   generating a set of first-level minor compaction files including the minor compaction file, each first-level minor compaction file aggregating a respective set of transactions; and
   responsive to determining that a number of first-level minor compaction files reaches a threshold number, generating a second-level minor compaction file aggregating the set of transactions in the set of first-level minor compaction files.

3. The method of claim 1, further comprising:
   iteratively creating hierarchical minor compaction files comprising multiple levels of minor compaction files, each higher level minor compaction file aggregating information on a respective set of transactions obtained from a respective set of lower level minor compaction files.

4. The method of claim 3, further comprising:
   determining a number of minor compaction levels (k) based on a threshold number of files (n) that each minor compaction aggregates and a threshold number of files (m) to read from the cloud storage.

5. The method of claim 1, wherein generating the second checkpoint file comprises:
   aggregating the state of the data table at the first time with information on the set of transactions obtained from the minor compaction file and an additional set of transactions in an additional set of log files; and
   computing the state of the data table at the second time based on the aggregation.

6. The method of claim 1, wherein the set of log files are in a form of JSON files.

7. The method of claim 1, wherein each log file records one or more actions performed to the data table in a transaction corresponding to the log file.

8. A non-transitory computer readable storage medium comprising stored program code, the program code comprising instructions, the instructions when executed cause a processor system to:
   receive, from one or more client devices, requests to commit one or more transactions to a data table and write metadata for the one or more transactions to one or more log files, wherein the data table is stored in a cloud storage as a set of data files;
   generate a checkpoint file aggregating the one or more transactions described in the one or more log files to compute a state of the data table at a first time;
   receive requests to commit a set of transactions to the data table and write metadata for the set of transactions to a set of log files;
   responsive to determining that a number of log files in the set of log files reaches a threshold commit number, generate a minor compaction file aggregating the set of transactions in the set of log files; and
   generate a second checkpoint file aggregating the state of the data table at the first time with information on the set of transactions obtained from the minor compaction file to compute a state of the data table at a second time.

9. The non-transitory computer readable storage medium of claim 8, wherein the instructions when executed further cause the processor system to:
   generate a set of first-level minor compaction files including the minor compaction file, each first-level minor compaction file aggregating a respective set of transactions; and
   responsive to determining that a number of first-level minor compaction files reaches a threshold number, generate a second-level minor compaction file aggregating the set of transactions in the set of first-level minor compaction files.

10. The non-transitory computer readable storage medium of claim 8, wherein the instructions when executed further cause the processor system to:
    iteratively creating hierarchical minor compaction files comprising multiple levels of minor compaction files, each higher level minor compaction file aggregating information on a respective set of transactions obtained from a respective set of lower level minor compaction files.

11. The non-transitory computer readable storage medium of claim 10, wherein the instructions when executed further cause the processor system to:
determine a number of minor compaction levels based on a threshold number and a threshold number of files to read from the cloud storage.

12. The non-transitory computer readable storage medium of claim 8, wherein the instruction to generate the second checkpoint file, when executed further cause the processor system to:
aggregate the state of the data table at the first time with information on the set of transactions obtained from the minor compaction file and an additional set of transactions in an additional set of log files; and
compute the state of the data table at the second time based on the aggregation.

13. The non-transitory computer readable storage medium of claim 8, wherein the set of log files are in a form of JSON files.

14. The non-transitory computer readable storage medium of claim 8, wherein each log file records one or more actions performed to the data table in a transaction corresponding to the log file.

15. A system comprising:
one or more computer processors; and
one or more computer-readable mediums storing instructions that, when executed by the one or more computer processors, cause the system to:
receive, from one or more client devices, requests to commit one or more transactions to a data table and write metadata for the one or more transactions to one or more log files, wherein the data table is stored in a cloud storage as a set of data files;
generate a checkpoint file aggregating the one or more transactions described in the one or more log files to compute a state of the data table at a first time;
receive requests to commit a set of transactions to the data table and write metadata for the set of transactions to a set of log files;
responsive to determining that a number of log files in the set of log files reaches a threshold commit number, generate a minor compaction file aggregating the set of transactions in the set of log files; and generate a second checkpoint file aggregating the state of the data table at the first time with information on the set of transactions obtained from the minor compaction file to compute a state of the data table at a second time.

16. The system of claim 15, wherein the instructions when executed by the one or more computer processors, further cause the system to:
generate a set of first-level minor compaction files including the minor compaction file, each first-level minor compaction file aggregating a respective set of transactions; and
responsive to determining that a number of first-level minor compaction files reaches a threshold number, generate a second-level minor compaction file aggregating the set of transactions in the set of first-level minor compaction files.

17. The system of claim 15, wherein the instructions when executed by the one or more computer processors, further cause the system to:
iteratively create hierarchical minor compaction files comprising multiple levels of minor compaction files, each higher level minor compaction file aggregating information on a respective set of transactions obtained from a respective set of lower level minor compaction files.

18. The system of claim 17, wherein the instructions when executed by the one or more computer processors, further cause the system to:
determine a number of minor compaction levels based on a threshold number and a threshold number of files to read from the cloud storage.

19. The system of claim 15, wherein the instruction to generate the second checkpoint file, when executed by the one or more computer processors, further cause the system to:
aggregate the state of the data table at the first time with information on the set of transactions obtained from the minor compaction file and an additional set of transactions in an additional set of log files; and
compute the state of the data table at the second time based on the aggregation.

20. The system of claim 15, wherein the set of log files are in a form of JSON files.

* * * * *